May 7, 1968 C. H. ALLEN 3,381,497
UNIVERSAL JOINT
Filed Oct. 10, 1966
2 Sheets-Sheet 1
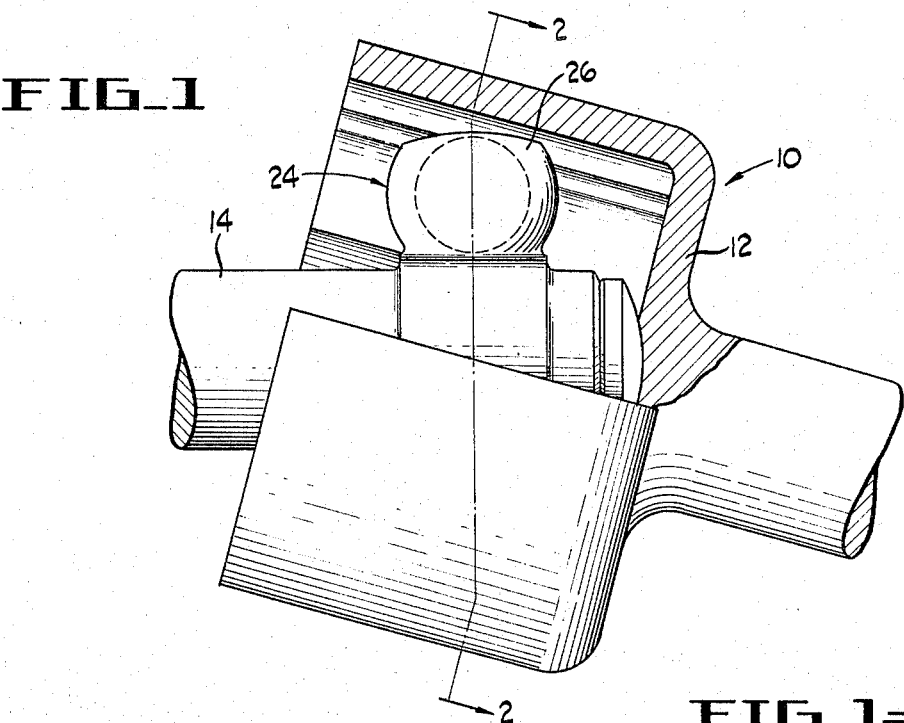
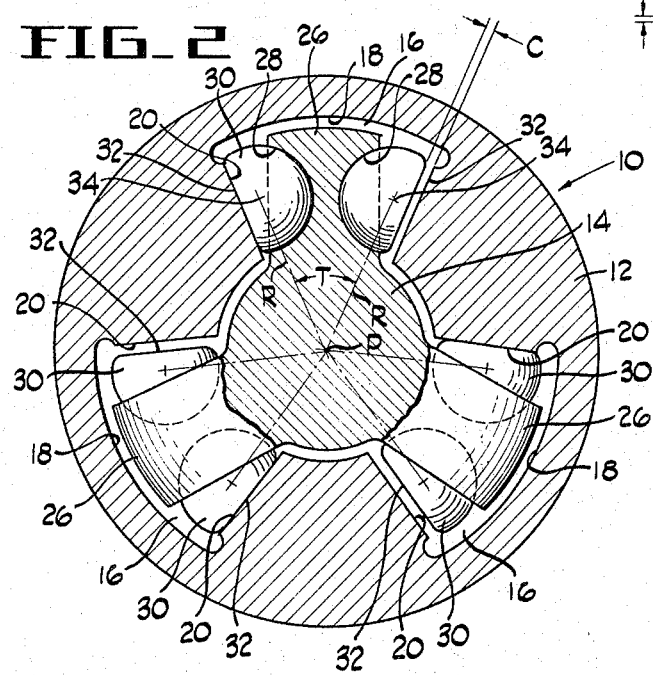
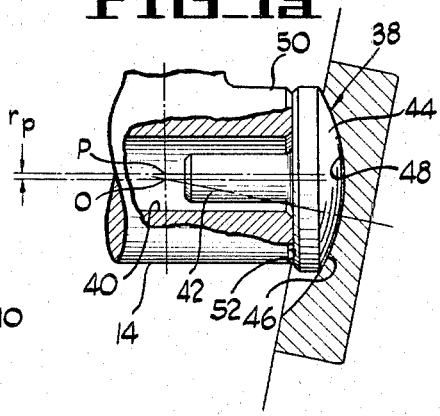
INVENTOR
CLIFFORD H. ALLEN
BY Robert V. Jambor
ATTORNEY May 7, 1968 C. H. ALLEN 3,381,497
UNIVERSAL JOINT
Filed Oct. 10, 1966 2 Sheets-Sheet 2
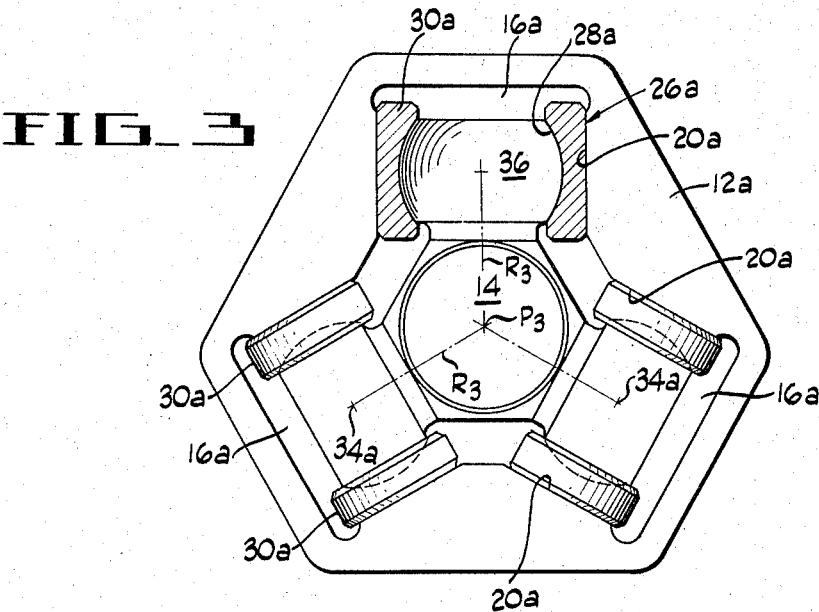
FIG_3
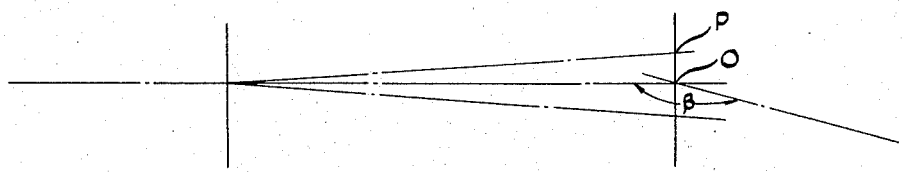
FIG_4
INVENTOR
CLIFFORD H. ALLEN
BY Robert V. Jambor
ATTORNEY

United States Patent Office 3,381,497
Patented May 7, 1968

3,381,497
UNIVERSAL JOINT
Clifford H. Allen, Chesterland, Ohio, assignor to Borg-Warner Corporation, Chicago, Ill., a corporation of Illinois
Filed Oct. 10, 1966, Ser. No. 585,442
7 Claims. (Cl. 64—7)

This invention relates to a universal joint or coupling and more particularly to a constant velocity coupling in which relatively great torque may be transmitted at relatively great angular displacement between the driving and driven shafts.

Great effort has been expended in the past in attempts to devise a practical constant velocity universal coupling. Some of the units resulting from these attempts have been complex and relatively expensive. One type consisted of two or more coaxial, stiff coil springs which resulted in high bearing loads, high stresses and reduced efficiency due to friction between coils. Other types of constant velocity couplings required a pair of cooperating joints joined by intermediate components. These couplings had limited usage because the maximum useful shaft angle was limited due to stresses resulting from bending of the intermediate component or from loss of the desired constant velocity characteristic at higher displacement angles. Some of these dual joint designs required expensive apparatus to maintain the torque transmitting bearings aligned in a homokinetic plane to provide the requisite constant velocity as the shaft angle changed.

Most of the prior constant velocity couplings were characterized by reduced torque capacity at increased shaft angle, limited end motion, and undesirable heat levels at high speed and great shaft angle. Still others of the prior constant velocity couplings were characterized by insufficient bearing surface due to the desire for flexibility in operation.

One of the prior art couplings uses a pair of Cardan joints in back-to-back relationship. By this arrangement, the inherent disadvantage of the Cardan joint, i.e., variable velocity, is obviated since velocity variations in the first joint are cancelled out in the second joint. A disadvantage of this arrangement is that the two joints must be carefully aligned in the planes of rotation and great care must be exercised in assuring equal intersecting shaft angles. Another disadvantage of the dual Cardan arrangement is the existence of variable velocity and torque within the intermediate member and the effect of secondary torque fluctuation which tends to bend the intermediate member and increase the bearing load. This fluctuation tends to induce severe whip in the intermediate member at frequencies approaching its natural frequency. The whipping action produces undesirable vibrations which have a deleterious effect on the entire drive line. Another disadvantage of the dual Cardan joint coupling is the need for a sliding spline to provide axial freedom. This highly loaded spline is characterized by high static breakaway friction and imposes relatively great thrust forces on the bearings.

A principal object of the invention is, therefore, to provide a constant velocity universal coupling, capable of transmitting relatively high torque at relatively high speeds through a wide range of shaft angles.

Another object of the invention is to provide a universal coupling of the stated type which is characterized by simplicity of construction, economy of manufacture and increased life and durability.

A further object of the invention is to provide a universal coupling of the constant velocity type in which comparatively great axial relative motion is permitted.

Still another object of the invention is to provide a constant velocity universal coupling in which the need for secondary centering and alignment yokes is obviated.

These and other objects of the invention will be apparent from the following descriptions and accompanying drawings, wherein:

FIGURE 1 is an elevational view, partly in section, of a universal coupling made in accordance with the present invention;

FIGURE 1a is an enlarged fragmentary elevational view, partly in section, of a detail of the coupling of FIGURE 1;

FIGURE 2 is an elevational sectional view taken substantially on line 2—2 of FIGURE 1;

FIGURE 3 is a view similar to FIGURE 2 but showing another modified form of the invention, and;

FIGURE 4 is a diagrammatic view illustrating the orbital motion of the joint of the coupling of the invention.

Referring now to the drawings and more particularly to FIGURES 1 and 2, the universal coupling of the present invention is indicated generally by reference numeral 10 and includes an input member 12, of hollow cylindrical construction, and an output member 14. It will be appreciated that the designations "input" and "output" are merely for the purpose of convenience and that the functions of these two members may be reversed if desired.

The input member 12, as best seen in FIGURE 2, is formed with three longitudinally extending axial grooves 16, circumferentially equally spaced about its longitudinal centerline each of which is defined by an arcuate surface 18, and a pair of substantially flat radial surfaces 20.

The output member 14 includes a spider 24 having three torque arms 26 circumferentially equally spaced about its longitudinal centerline and which extend radially outward. Each of the torque arms 26 is provided at the outer end with a pair of oppositely disposed sockets 28 within which are mounted a pair of pads 30. Each of the pads 30 is formed with a flat surface 32, which engages the adjacent flat surface 20 of the groove 16 and a spherical surface contacting the socket 28. Torque may be transmitted from the driving member 10 to the driven member 14, or vice versa, as will be understood, in either direction of rotation by this engagement between one of the pads 30 and the adjacent flat surface of the groove.

Referring to FIGURE 2 there is indicated an axis P of the output shaft and member 14 and points 34 which are the spherical centers of the pads 30. Straight lines, shown in phantom which extend between points P and each spherical center are designated as the torque arm axes of the associated pads. In the embodiment of FIGURE 2 therefore each torque arm includes two torque arm axes, one associated with each of the pads of each torque arm.

It is important to note that the flat radial surfaces 20 of the input member 12 are formed such that they are parallel to the torque arm axis R of the pad with which they are associated and also the axis P when the angle of shaft intersection is zero, i.e., the shafts and input and output members are coaxially aligned.

The required length of each groove 16 is determined to allow for the necessary axial travel between the pads 30 and the shell 12 during the angular rotation between the axes of the shell 12 and the output member 14. As this rotation occurs, each of the pads describes an arcuate path in a plane which intersects the axis of the output member 14. A component of this relative movement is, of course, axial. In addition, each of the grooves 16 is of sufficient length to accommodate any necessary axial shaft displacement in operation and also to accommodate production tolerances.

It will be appreciated that only one pad 30 may be provided for each torque arm 26 if rotation in only one direction is contemplated. In that case the opposite outer edge of each torque arm may be arcuately formed about the point 34 and the associated flat surface may be engaged by this arcuate corner when backlash occurs. In this case also the associated flat backlash surfaces of the groove also should be parallel to the torque arm axis when the shaft intersection angle $\beta$ is zero degrees. It should further be noted that the planes of the flat groove surfaces 20 must be parallel with the longitudinal axis of the input shell 12.

Orbital motion of the output member 14 with respect to the input shell 12 is afforded as the pads 30 describe their arcuate paths. The plane of the orbital motion is normal to the axis of output member 14. Axial stability of the orbital shaft is afforded by a thrust bearing assembly 38 illustrated in FIGURE 1a. The right end of the output member 14 as shown in FIGURE 1a is provided with an axial bore 40 and in this bore is received a shank 42 affixed to an end cap 44 having an arcuate surface 46 described upon orbit center O, the projected point of intersection of the axes of shaft 14 and member 12. The cap 44 rests in ingagement with a corresponding spherical surface 48 also described upon the orbit center O. The cap 44 has a thrust bearing surface 50 which is engaged by the orbiting end 52 of the output member 14. The shank 42 is free to oscillate within the bore 40 without engaging the sides thereof. The output member 14 is biased into engagement with the surface 50 by normal axial thrust or may be spring biased, if desired, in cases where axial displacement will occur during operation of the joint. In this latter case the spherical surface 48 can be carried on the facing end of a spring loaded plunger coaxial with input member 10.

In FIGURE 3 there is illustrated a modified form of the present invention in which an input shell 12a is formed with three longitudinally extending internal axial grooves 16a equally spaced about its circumference having spaced parallel flat surfaces 20a. Each of the torque arms 26a includes at the outer end a truncated sphere 36. Each of the spheres 36 engages a pair of oppositely disposed pads 30a each having an arcuate surface 28a corresponding to the radius of the associated sphere. In this form of the invention the pads 30a describe an arcuate path as the output shaft 14 orbits in a manner illustrated in FIGURE 4. It will be understood that one of the pads 30a may be eliminated and the space between the surfaces 20a correspondingly narrowed when rotation in only one direction is contemplated.

The spherical center of the sphere 36 is located at point 34a. In this embodiment therefore each torque arm has only one torque arm axis i.e. the phantom line $R_3$ which extends from the point 34a to the shaft centerline $P_3$. The planar surfaces 20a of each groove are formed parallel to the torque arm axis of the associated torque arm and also the shaft centerline $P_3$ as in the embodiment of FIGURES 1 and 2. Since each arm 26a has only one torque arm axis the surfaces 20a are additionally parallel to each other rather than radially directed in the previously described embodiment.

In the form of the invention illustrated in FIGURE 2 the backlash clearance C must be sufficient so as to not interfere with the orbit radial displacement. This is given the following equation;

$$\text{Min. } C = r_p \sin T$$

where
$C$ = minimum backlash clearance
$r_p$ = orbit radius
$T$ = angle between torque arm axes.

In the form of FIGURE 3 there is no such limitation on minimum backlash clearance and this form is to be preferred when rotation is desired in both directions.

In both forms of the invention the constant velocity relationship is achieved by virtue of the orbiting motion of the driven shaft above described. The axis P of the driven shaft 14 orbits at a constant radial distance about the theoretical point of intersection O, see FIGURE 4. The direction of orbit rotation is the same as that of shaft rotation and the frequency of orbiting is three times that of the shaft rotation. The angular velocity of any one of the three sets of bearing pads about point O is not constant but follows Equation I:

$$\frac{\omega\phi}{\omega\theta} = \frac{\cos\beta}{1-\sin^2\theta\sin\beta} \qquad (I)$$

where
$\phi$ = angular, displacement of driven shaft
$\theta$ = angular, displacement of driving shaft
$\beta$ = angle of intersection between driven and driving shafts
$\omega$ = velocity symbol Angular velocity of driven shaft 14 about its axis P is maintained constant by addition of the velocity of translation of the axis P in its orbit about point O. It will be noted that the need for a homokinetic plane is obviated. The following derived equations completely describe the motion of the universal coupling of the invention:

$$\lambda = \theta \qquad (II)$$
$$\omega\lambda = \omega\theta \qquad (III)$$
$$\psi = 3\theta = 180° \qquad (IV)$$
$$\omega\psi = 3\omega\theta \qquad (V)$$
$$\gamma_p = \frac{.5R(1-\cos\beta)}{(\cos\beta)} \qquad (VI)$$

where
$\theta$ = angle of driving shaft rotation
$\lambda$ = angle of driven shaft rotation
$\omega$ = velocity symbol
$\psi$ = angular position of driven shaft centerline in its orbit
$\gamma_p$ = radius of orbit, driven shaft
$R$ = radial length of torque arm
$\beta$ = angle between shaft centerlines.

It is, of course, understood that if the driving member 12 is supported on a fixed centerline by bearings then the driven shaft cannot be so supported or vice versa. In the present description the driven shaft is described as orbiting at its joined end and its other end must be supported in a suitable manner. This may be accomplished by a self-aligning shaft bearing, a crowned tooth spline, a flexible coupling or a second universal joint similar to that above described.

The coupling of the present invention exhibits important advantages over constant velocity couplings heretofore know. The arrangement of the constituent elements of the present coupling overcomes the disadvantages of either a single or dual Cardan type joint. Furthermore, the need for a homokinetic plane is obviated and the present coupling is suitable for use where constant velocity is required at either high or low shaft displacement angles.

I claim:
1. A universal coupling for a pair of shafts comprising a driving member adapted to be connected to an end of one of said shafts and a driven member adapted to be connected to an end of the other of said shafts, one of said members including a hollow shell having three longitudinally extending axial grooves circumferentially equally spaced about its longitudinal centerline, each said groove including at least one substantially flat surface extending inwardly of said shell, the other of said members including a spider having three torque arms circumferentially equally spaced about its longitudinal centerline, each said torque arm extending radially outwardly into a separate one of said axial grooves of said other member and having at least one bearing pad connected thereto including a substantially flat surface adapted to slide on said substantially flat surface of said axial groove associated with said torque arm, said pads being connected to said torque arms by means form- ing a ball and socket joint therebetween and being pivotally movable about a spherical center of said ball and socket joint, and substantially flat surface of each said groove of said shell being formed parallel to a line passing through said spherical center of said associated ball and socket joint and the longitudinal axis of said member, said surface further being formed parallel to the longitudinal axes of both said driving and driven member, when said members are coaxially aligned.

2. A universal coupling as claimed in claim 1 wherein each said groove includes a pair of said substantially flat surfaces extending inwardly of said shell, a pad is provided for each said flat surface of said groove, each said pad being connected to said torque arm by a separate ball and socket joint which includes a separate spherical center, said substantially radially directed and being formed parallel to a line passing through said spherical center of said associated ball and socket joint and the longitudinal axis of said member, said surfaces further being formed parallel to the longitudinal axes of both said driving and said driven members when said members are coaxially aligned.

3. A universal coupling as claimed in claim 1 wherein one member of said coupling includes a self-aligning thrust bearing having an end cap associated with one of said members provided with a concave spherical socket facing the other of said members said other of said members including an end cap having a convex spherical surface disposed in sliding contact with said concave surface of said end cap of said first member.

4. A universal coupling as claimed in claim 1 wherein each of said pads of said spider describes an arcuate path in a plane parallel to the associated substantially flat surface of said grooves, said paths intersecting the point of intersection of the longitudinal centerlines of said members.

5. A universal coupling as claimed in claim 1 wherein said torque arms include a portion formed to define a truncated spheroid having a spherical center and wherein said pads include sockets to receive portions of said spheroids.

6. A universal coupling as claimed in claim 5 wherein each said groove includes a pair of substantially flat surfaces extending inwardly of said shell, each torque arm is provided with a pair of pads, each of said pair of pads being in sliding contact with a separate one of said substantially flat surfaces of said grooves.

7. A universal coupling as claimed in claim 6 wherein substantially flat surfaces of the grooves are parallel to each other and parallel to a line extending between said single spherical center and the longitudinal axis of said member as well as being parallel to the longitudinal centerline of each said members when said members are coaxially aligned.

References Cited

UNITED STATES PATENTS

| | | | |
|---|---|---|---|
| 2,125,615 | 8/1938 | Kittredge | 64—7 |
| 2,715,325 | 8/1955 | Du Pont | 64—21 |
| 2,910,845 | 11/1959 | Wahlmark | 64—21 |
| 3,125,870 | 3/1964 | Orain | 64—7 |

HALL C. COE, *Primary Examiner.*

UNITED STATES PATENT OFFICE

CERTIFICATE OF CORRECTION

Patent No. 3,381,497　　　　　　　　　　　　　May 7, 1968

Clifford H. Allen

It is certified that error appears in the above identified patent and that said Letters Patent are hereby corrected as shown below:

Column 5, line 3, "and" should read -- said --.

Signed and sealed this 28th day of October 1969.

(SEAL)
Attest:

Edward M. Fletcher, Jr.　　　　　　　　　　WILLIAM E. SCHUYLER, JR.
Attesting Officer　　　　　　　　　　　　　　Commissioner of Patents